United States Patent Office 3,403,594
Patented Oct. 1, 1968

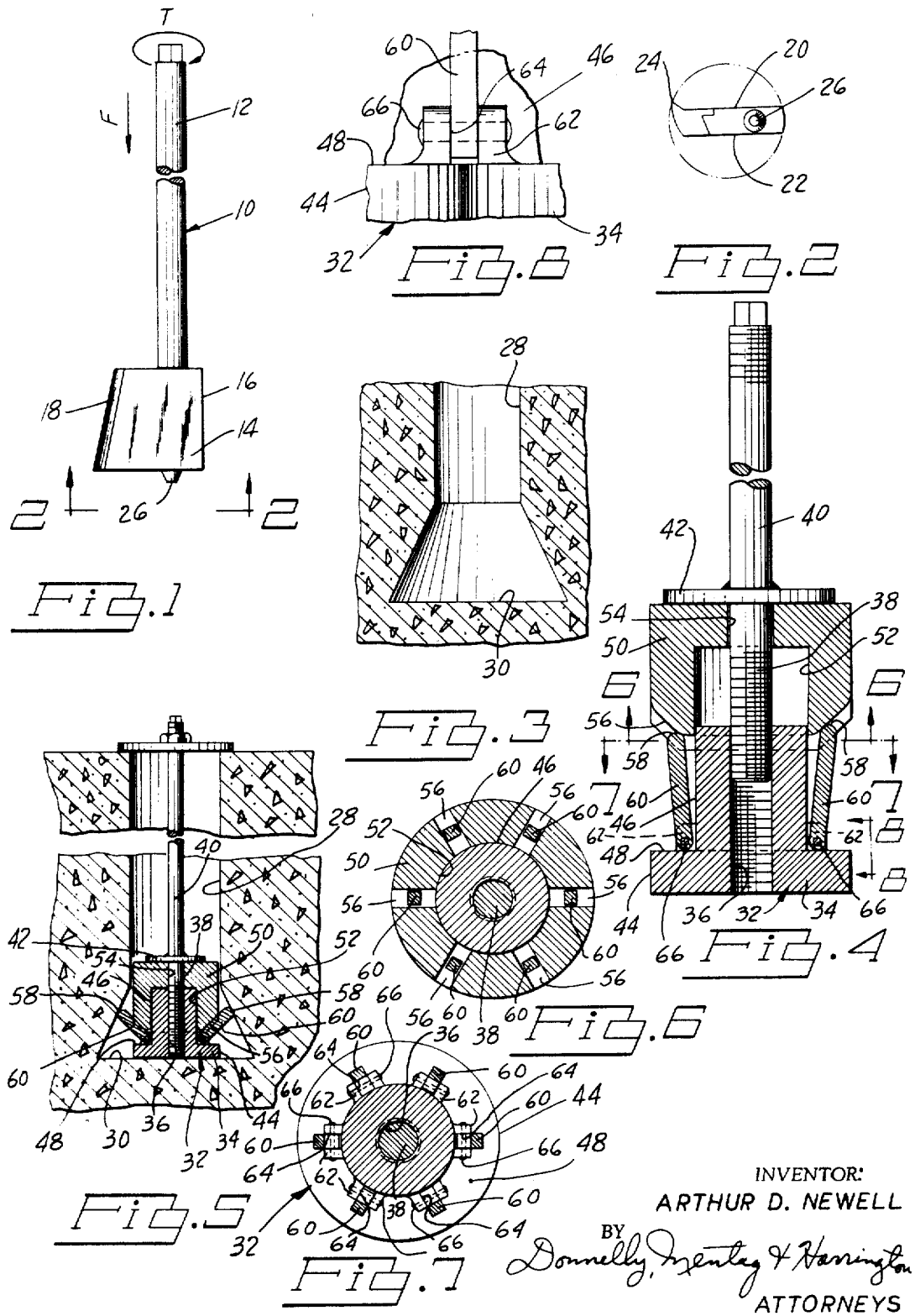

3,403,594
ANCHOR ASSEMBLY FOR RETAINING BOLTS IN DRILLED HOLES
Arthur D. Newell, Detroit, Mich., assignor to Zimmer, Keller and Calvert, Inc., Detroit, Mich., a corporation of Michigan
Filed July 18, 1966, Ser. No. 565,758
4 Claims. (Cl. 85—74)

ABSTRACT OF THE DISCLOSURE

This specification describes an anchor bolt assembly for securing retainer bolts in a drilled opening formed in stone or masonry material. It includes a threaded base over which is telescopically received a pilot cap which registers with the neck portion of the opening. An annular cam surface is formed on the cap which expands locking elements supported by the base. The locking elements wedge against the walls of the blind end of the opening.

---

My invention relates generally to masonry drills and anchor bolt assemblies for retaining anchor bolts in a drilled opening formed in masonry material.

The improvements of my invention include masonry methods and structure adapted especially for use in masonry work where anchor bolts must be retained within bored openings in stone or concrete. Such anchor bolts are used, for example, in securing foundations and structural reinforcing members to a concrete base and in strengthening natural rock faces in mining, excavation, and structural work.

I am aware of certain prior art inchoring elements for retaining threaded shafts and bolts in a drilled opening formed in concrete or stone. These usually include retaining inserts having a base which expands to provide frictional engagement with the walls of the bored opening. The improvements of my invention make possible a greater holding power for any given hole size and for any given diameter of the threaded bolt or shaft.

With conventional expansible anchoring elements for anchor bolts or the like, it is necessary for the insert to become tightened before a sufficient frictional gripping action will occur with the walls of the bored opening. If the insert is not completely tightening with a recommended clamping force, the bolt will not gain maximum holding strength against applied tension. But even in some instances when the insert is tightened completely to the recommended holding force, it is possible for the insert to be pulled out of the bored opening due to breaking away from the face material of the hole against which the insert is tightened.

It is an object of my invention to provide a means for attaching threaded shafts and bolts in concrete or stone in such a way that the ultimate holding capacity is increased substantially over that which can be achieved with expansible anchor bolts of known construction.

It is a further object of my invention to provide a means for retaining threaded shafts and bolts within concrete or stone, wherein only simple, inexpensive elements and a simple preliminary drilling operation are required following an initial drilling operation with a conventional drilling tool.

In practicing my invention, it is necessary to form, as a preliminary step, a cylindrical opening in the stone or concrete by means of a conventional drilling tool. The opening is of a uniform diameter and extends to the desired depth. After the cylindrical opening is formed, my improved masonry drill is inserted into the bored opening. The masonry drill has a cutting edge that is offset with respect to the axis of the shank portion of the drill. A friction pivot point, which normally is in alignment with the shank portion of the drill, engages the base of the preformed bored opening and provides a reaction force for the cutting effort of the cutting edge against the wall material as the masonry drill is rotated.

The cutting edge is adapted to form an enlarged transverse dimension at the lower end of the bored opening. The shape of the enlarged end of the opening is determined by the configuration of the cutting edge. Normally the cutting edge forms an acute angle with respect to the axis of the shank portion of the drill so that the resulting finished shape of the base of the bored opening resembles a conical surface of revolution. Various individual shapes or angles for the cutting edge can be used in order to produce whichever specific shape of enlarged opening is desired for any given application.

The drill can be withdrawn through the opening. An anchor bolt is threaded partially into the anchoring insert and the insert then is placed in the bored opening. As the bolt is rotated, applying pressure against the anchoring insert to hold it against the bottom of the hole, the threading action will actuate clamping elements in the insert. These elements engage the angled walls of the base of the opening and thereby provide a permanent anchor which will prevent withdrawal of the bolt as the bolt is tensioned.

For the purposes of describing more particularly the improvements of my invention, reference will be made to the accompanying drawings, wherein:

FIG. 1 shows a side elevational view of the improved masonry drill which is used following the initial boring operation;

FIG. 2 is a bottom view of the structure of FIG. 1 as seen from the plane of section line 2—2 of FIG. 1;

FIG. 3 is a longitudinal cross sectional view of a bored opening following a drilling operation with the tool of FIG. 1;

FIG. 4 is an assembly view showing my improved insert assembled with a threaded shaft;

FIG. 5 is a view showing the insert of FIG. 4 inserted in the hole of FIG. 3;

FIG. 6 is a cross sectional view taken along the plane of section line 6—6 of FIG. 4;

FIG. 7 is a transverse cross sectional view taken along the plane of section line 7—7 of FIG. 4; and, FIG. 8 is a side view of the insert of FIG. 4, as seen from the plane of section line 8—8 of FIG. 4.

In FIG. 1, the masonry drill, which is identified with reference character 10, includes a shank 12 and a base 14. The shank 12 is secured permanently to the base 14, the latter having a generally vertical side 16, which extends in a direction parallel to the axis of the shank 12. The left hand margin of the base 14 defines a cutting edge 18. The cutting edge 18 is formed to the desired shape of the hole to be formed.

The base 14 has a generally rectangular form as indicated in FIG. 2 with oppositely disposed flat surfaces 20 and 22. The left hand cutting edge 18, by preference, may be formed of an insert 24 of hard cutting alloy such as tungsten carbide while the base 14 itself can be formed of high carbon steel.

The lower end of the base 14 carries a pivot member 26 which is made of wear-resistant material, such as tungsten carbide, and which engages frictionally the bottom of the initially bored opening. The member 26 is in direct alignment with the axis of the shank 12.

In operation, the concrete, rock or stone is drilled with a conventional drill to form a cylindrical opening, a part of which is indicated in FIG. 3 at 28. The drill shown in FIG. 1 then may be inserted in the opening 28 until the friction member 26 engages the base 30 of the opening. The maximum distance from the side 16 of the base 14 to the extended tip of the edge 18 should be slightly less than the diameter of the opening 28. As a force is applied to the drill of FIG. 1 in the direction of the vector F, the friction member 26 frictionally engages the base surface 30. As torque is applied clockwise in the direction of the vector T, the edge 18 will cut an opening into the circular wall of the opening 28. During the initial cutting action the friction member 26 will be offset with respect to the center line of the opening 28. As the drill 10 rotates under the influence of torque T, member 26 will slide in a circular pattern over the surface 30. As it does this, the cutting edge 18 will gradually enlarge the transverse dimensions of the base of the opening 28. The shape of the base of the opening 28 that is assumed will depend upon the shape of the cutting edge 18. In the particular embodiment shown in FIG. 1, the cutting edge 18 is shaped so that an angular opening will be formed as indicated in FIG. 3.

This cutting action will continue and the circular motion pattern of the friction member 26 will continue as long as eccentricity is present. The diameter of the circular path traveled by the friction member 26 will progressively decrease as the cutting becomes more advanced. Finally, the friction member 26 will become aligned almost directly with the axis of the opening 28. Effective cutting action then ceases. FIG. 3 represents the shape of the base of the opening after the cutting action is completed.

The tool 10 then can be withdrawn through the opening 28 in the same way that it is inserted with the shank 12 assuming an off-center position during withdrawal. Following this the insert, which is indicated generally by reference character 32 in FIG. 5, can be inserted into the enlarged end of the opening 28. FIG. 4 illustrates the insert in more particular detail.

The insert 32 includes the circular base 34 having an internal, centrally situated threaded opening 36. Received within the opening 36 is a threaded end 38 from an anchor bolt or shaft 40 which is long enough to reach the mouth of the opening 28. A shoulder in the form of a flange 42 is carried by the shank of the bolt 40.

The base member 34 includes a large diameter part 44 and a smaller diameter part 46 thereby defining a stepped shoulder 48. Telescopically received over the portion 46 is a cylindrical cap element 50 having a central, internal circular bore 52. The shank 40 of the bolt is received through an opening 54 in the element 50 and the threaded end 38 can be adjusted within the opening 36 as the shank 40 rotates. Upon rotation of the shank 40, the smaller diameter part 46 of the base 34 is received within the opening 52 in telescopic relationship.

The lower end of the element 50 forms a circular cam 56 which is engaged by the upper end 58 of clamping elements 60. These elements are journaled on the shoulder 48.

As best seen in FIG. 8, shoulder 48 is provided with bosses 62 in each of which is formed, either by casting or machining, a slot 64. The lower end of each element 60 is received within a slot 64 and is pinned therein for oscillation about a mounting pin 66. The plane of oscillation of the elements 60 contains the axis of the base 34. The number of such elements 60 is variable.

As the bolt 40 is threadably received within the opening 36, the clamping elements 60 will cam against the surface 56 as element 50 is forced downwardly until they assume the position shown in FIG. 5. The outer margins of the clamping elements 60 then engage the inner cone surface of the base 30 of the opening 28. This establishes a locking action which prevents removal of the insert and the threaded bolt or shaft. A positive locking action occurs regardless of whether the shank 40 is fully tightened. The clamping elements 60 will be placed under compression and establish a clamping action whenever they are pivoted sufficiently to cause engagement with the angled walls of the expanded base of the opening 28.

The holding effort that is achieved with my improved construction does not depend upon the frictional engagement of the insert with respect to the wall. The holding action is achieved by a positive clamping effort rather than by any frictional resistance offered by the wall of the opening.

Having described a preferred form of my invention, what I claim and desire to secure by U.S. Letters Patent is:

1. In an anchor assembly for securing an anchor bolt in a drilled opening formed in concrete or stone where the blind end of said opening is enlarged in diameter relative to the diameter of the neck portion thereof, an anchor assembly comprising a first internally threaded base having a threaded opening receiving the threaded end of said bolt, a cylindrical, hollow cap received telescopically over said base, a cam surface formed by said cap surrounds said base, a reaction shoulder formed on said base engageable with said cap, clamping elements pivoted on said base and situated in camming engagement with the cam surface on said cap, the blind end of said opening being formed with an axial dimension less than the axial dimension of said cap whereby said cap registers with the wall of the neck portion of said drilled opening to hold said base part, said clamping elements engaging the walls of said blind end of said opening as said bolt is turned thereby causing clamping radially outward motion of said clamping elements.

2. The combination as set forth in claim 1 wherein said cam surface is annular in form with a geometric axis coinciding with the axis of said bolt, the unsupported ends of said clamping elements engaging said annular surface of said cap as it is telescopically received over said base.

3. The combination as set forth in claim 2 wherein said clamping elements are in the form of end supported levers pivoted on said base, each of said levers being adapted to oscillate in a plane that contains the axis of said bolt.

4. The combination as set forth in claim 2 wherein said clamping elements are end supported on said base and adapted to engage the cam surface on said hollow cap, the distance between corresponding points on the unsupported ends of any two clamping elements being less than the diameter of said neck portion when said cap and said base assume an extended position and being greater than the diameter of said neck portion when said cap and said base assume a telescoped position whereby said clamping elements establish a clamping effort for said bolt that is substantially independent of the torque applied to said bolt.

References Cited

UNITED STATES PATENTS

| 610,308 | 9/1898 | Seaman | 85—74 |
| 1,429,033 | 9/1922 | Harris | 85—73 |
| 2,349,075 | 5/1944 | Cole | 85—72 |

FOREIGN PATENTS

| 1,266,450 | 5/1961 | France. |
| 218,073 | 7/1924 | Great Britain. |
| 343,992 | 3/1931 | Great Britain. |
| 663,997 | 1/1952 | Great Britain. |
| 405,671 | 9/1943 | Italy. |

MARION PARSONS, Jr., *Primary Examiner.*